US 10,443,406 B2

(12) United States Patent
Propheter-Hinckley et al.

(10) Patent No.: US 10,443,406 B2
(45) Date of Patent: Oct. 15, 2019

(54) AIRFOIL HAVING NON-LEADING EDGE STAGNATION LINE COOLING SCHEME

(71) Applicant: United Technologies Corporation, Farmington, CT (US)

(72) Inventors: Tracy A. Propheter-Hinckley, Rocky Hill, CT (US); Dominic J. Mongillo, Jr., West Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 15/884,447

(22) Filed: Jan. 31, 2018

(65) Prior Publication Data

US 2019/0234218 A1 Aug. 1, 2019

(51) Int. Cl.
*F01D 5/18* (2006.01)
*F01D 5/14* (2006.01)

(52) U.S. Cl.
CPC .............. *F01D 5/187* (2013.01); *F01D 5/141* (2013.01); *F05D 2220/32* (2013.01); *F05D 2240/303* (2013.01); *F05D 2260/201* (2013.01); *F05D 2260/202* (2013.01); *F05D 2260/221* (2013.01)

(58) Field of Classification Search
CPC .......... F01D 15/187; F01D 5/18; F01D 5/187; F01D 5/186; F01D 5/141; F02C 3/04; F05D 2220/32; F05D 2240/303; F05D 2260/201; F05D 2260/202; F05D 2260/221
USPC ......................................................... 416/97
See application file for complete search history.

(56) References Cited

U.S. PATENT DOCUMENTS

| 4,738,587 A | 4/1988 | Kildea |
| 8,317,473 B1 | 11/2012 | Liang |
| 2014/0199177 A1 | 7/2014 | Propheter-Hinckley et al. |
| 2016/0010463 A1 | 1/2016 | Quach et al. |
| 2016/0376989 A1* | 12/2016 | Quach ................... F02C 3/04 60/806 |

FOREIGN PATENT DOCUMENTS

| EP | 2940248 A1 | 11/2015 |
| EP | 3043026 A2 | 7/2016 |
| WO | 2015035363 A1 | 3/2015 |

OTHER PUBLICATIONS

European Search Report for European Application No. 19154319.8, International Filing Date Jan. 29, 2019, dated Jul. 29, 2019, 6 pages.

* cited by examiner

*Primary Examiner* — Nathaniel E Wiehe
*Assistant Examiner* — David Whittaker
(74) *Attorney, Agent, or Firm* — Cantor Colburn LLP (57) ABSTRACT

Components for gas turbine engines are provided. The components include an airfoil extending between a first end and a second end and from a leading edge to a trailing edge. The airfoil has a pressure side and a suction side. The airfoil has a non-leading edge stagnation line that transitions from a location along a leading edge surface of the airfoil at the first end to a location on the airfoil on the pressure side of the airfoil at the second end. A leading edge feed cavity is located in the leading edge of the airfoil and extending between the first end and the second end of the airfoil. A stagnation impingement cavity is formed extending along a surface of the airfoil that aligns with the non-leading edge stagnation line.

19 Claims, 8 Drawing Sheets

AIRFOIL HAVING NON-LEADING EDGE STAGNATION LINE COOLING SCHEME

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling for an airfoil may be desirable.

BRIEF DESCRIPTION

According to some embodiments, components for gas turbine engines are provided. The components include an airfoil extending in a radial direction from a first end to a second end, and extending axially from a leading edge to a trailing edge, the airfoil having a pressure side and a suction side, wherein the airfoil has a non-leading edge stagnation line formed during operation such that the non-leading edge stagnation line transitions from a location along a leading edge surface of the airfoil at the first end to a location on the airfoil on the pressure side surface of the airfoil at the second end, a leading edge feed cavity formed in the leading edge of the airfoil, the leading edge feed cavity extending between the first end and the second end of the airfoil, and a stagnation impingement cavity formed within the airfoil and extending along a surface of the airfoil that aligns with the non-leading edge stagnation line, such that a portion of the stagnation impingement cavity is located proximate the leading edge surface of the airfoil at the first end and a portion of the stagnation impingement cavity is located proximate a side surface of the airfoil at the second end, such as a pressure and/or suction side surface.

In addition to one or more of the features described herein, or as an alternative, further embodiments of the components may include that the airfoil is a blade, the first end is a root of the blade, and the second end is a tip of the blade.

In addition to one or more of the features described herein, or as an alternative, further embodiments of the components may include that the side of the airfoil at the second end is the pressure side of the airfoil.

In addition to one or more of the features described herein, or as an alternative, further embodiments of the components may include that the stagnation impingement cavity comprises a plurality of sub-cavities.

In addition to one or more of the features described herein, or as an alternative, further embodiments of the components may include at least one impingement aperture fluidly connecting the leading edge feed cavity to the stagnation impingement cavity.

In addition to one or more of the features described herein, or as an alternative, further embodiments of the components may include that the at least one impingement aperture is arranged to impinge upon an interior surface of the airfoil at the non-leading edge stagnation line.

In addition to one or more of the features described herein, or as an alternative, further embodiments of the components may include at least one purge hole formed in an external wall of the airfoil and arranged to purge air from within the stagnation impingement cavity.

In addition to one or more of the features described herein, or as an alternative, further embodiments of the components may include an impingement rib located within the airfoil and separating the leading edge feed cavity from the stagnation impingement cavity, wherein at least one impingement aperture is formed within the impingement rib to fluidly connect the leading edge feed cavity to the stagnation impingement cavity.

In addition to one or more of the features described herein, or as an alternative, further embodiments of the components may include that the impingement rib extends between the pressure side and the suction side of an interior of the airfoil proximate the first end and between the pressure side of the airfoil and an interior cavity wall proximate the second end.

In addition to one or more of the features described herein, or as an alternative, further embodiments of the components may include that the impingement rib extends between the pressure side and the suction side of an interior of the airfoil proximate the first end and between the suction side of the airfoil and an interior cavity wall proximate the second end.

In addition to one or more of the features described herein, or as an alternative, further embodiments of the components may include that the impingement rib extends between the leading edge of the airfoil and the pressure side of the airfoil at a location between the first end and the second end.

According to some embodiments, core assemblies for forming components of gas turbine engines are provided. The core assemblies include a leading edge feed cavity core arranged to form a leading edge feed cavity in a formed airfoil, the leading edge feed cavity core extending between a first end and a second end and a stagnation impingement cavity core connected to the leading edge feed cavity core and arranged to form a stagnation impingement cavity within a formed airfoil such that the formed stagnation impingement cavity aligns with a non-leading edge stagnation line. A portion of the stagnation impingement cavity core is located proximate a leading edge of the formed airfoil at the first end and a portion of the stagnation impingement cavity core is located proximate a side of the formed airfoil at the second end.

In addition to one or more of the features described herein, or as an alternative, further embodiments of the core assemblies may include that the stagnation impingement cavity core comprises a plurality of individual segregated cavity sub-cores predominantly along a radial direction that may reside between the first end extending to the second end of the airfoil span.

In addition to one or more of the features described herein, or as an alternative, further embodiments of the core assemblies may include at least one impingement aperture core arranged to form a respective impingement aperture in the formed airfoil to fluidly connect the formed leading edge feed cavity to the formed stagnation impingement cavity.

In addition to one or more of the features described herein, or as an alternative, further embodiments of the core assemblies may include that the airfoil is a high-lift blade of a gas turbine engine.

According to some embodiments, gas turbine engines are provided. The gas turbine engines include an airfoil extending in a radial direction from a first end to a second end, and extending axially from a leading edge surface to a trailing edge surface, the airfoil having a pressure side surface and a suction side surface, wherein the airfoil has a non-leading edge stagnation line formed during operation such that the non-leading edge stagnation line transitions from a location along a leading edge surface of the airfoil at the first end to a location on the airfoil on a pressure side surface of the airfoil at the second end, a leading edge feed cavity formed in the leading edge of the airfoil, the leading edge feed cavity extending between the first end and the second end of the airfoil, and a stagnation impingement cavity formed within the airfoil and extending along a surface of the airfoil that aligns with the non-leading edge stagnation line, such that a portion of the stagnation impingement cavity is located proximate the leading edge of the airfoil at the first end and a portion of the stagnation impingement cavity is located proximate a side of the airfoil at the second end.

In addition to one or more of the features described herein, or as an alternative, further embodiments of the gas turbine engines may include that the airfoil is a blade, the first end is a root of the blade, and the second end is a tip of the blade.

In addition to one or more of the features described herein, or as an alternative, further embodiments of the gas turbine engines may include that the blade is a high-lift blade of a gas turbine engine.

In addition to one or more of the features described herein, or as an alternative, further embodiments of the gas turbine engines may include that the stagnation impingement cavity comprises a plurality of sub-cavities.

In addition to one or more of the features described herein, or as an alternative, further embodiments of the gas turbine engines may include at least one impingement aperture fluidly connecting the leading edge feed cavity to the stagnation impingement cavity.

In addition to one or more of the features described herein, or as an alternative, further embodiments of the gas turbine engines may include at least one purge hole formed in an external wall of the airfoil and arranged to purge air from within the stagnation impingement cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
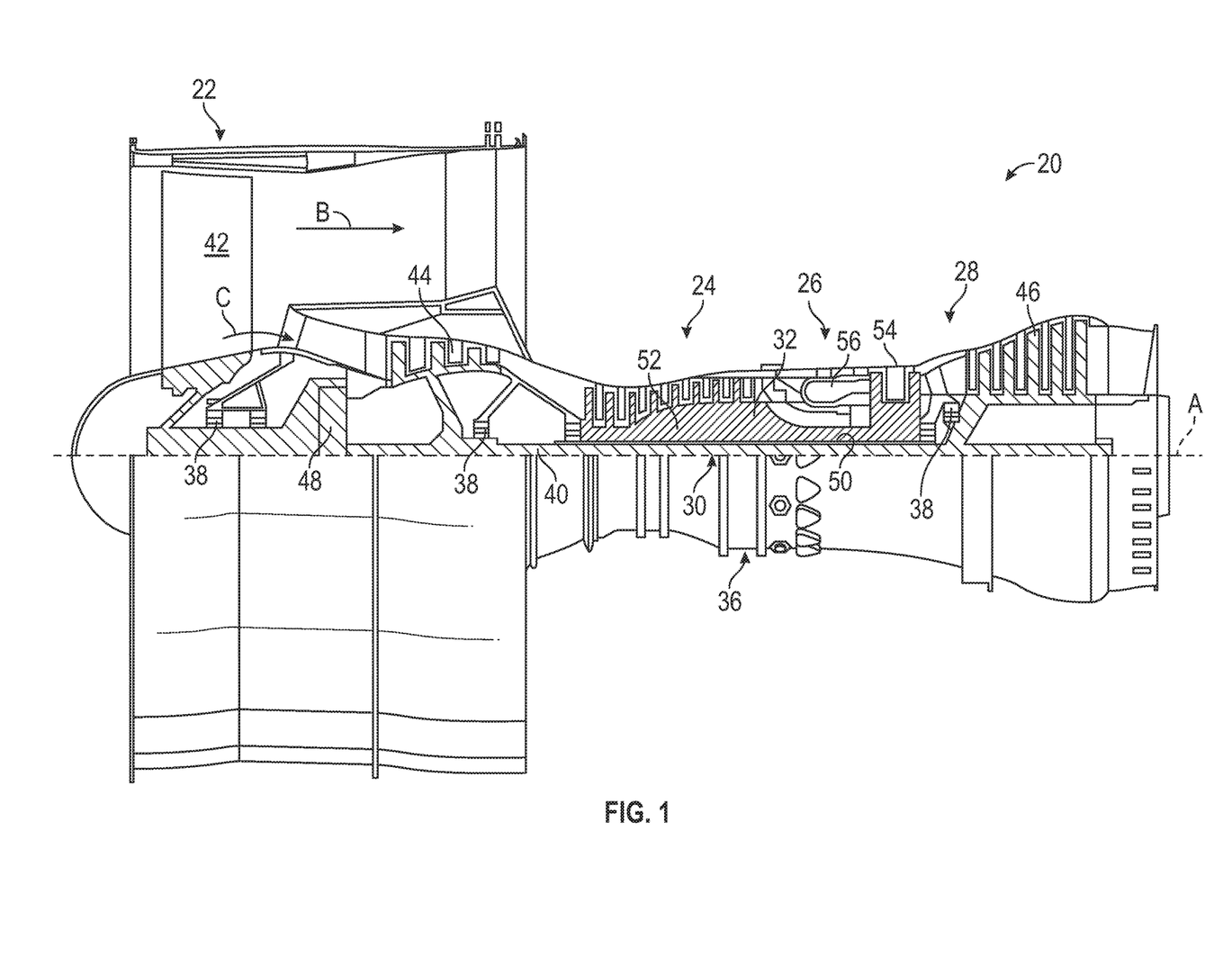
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
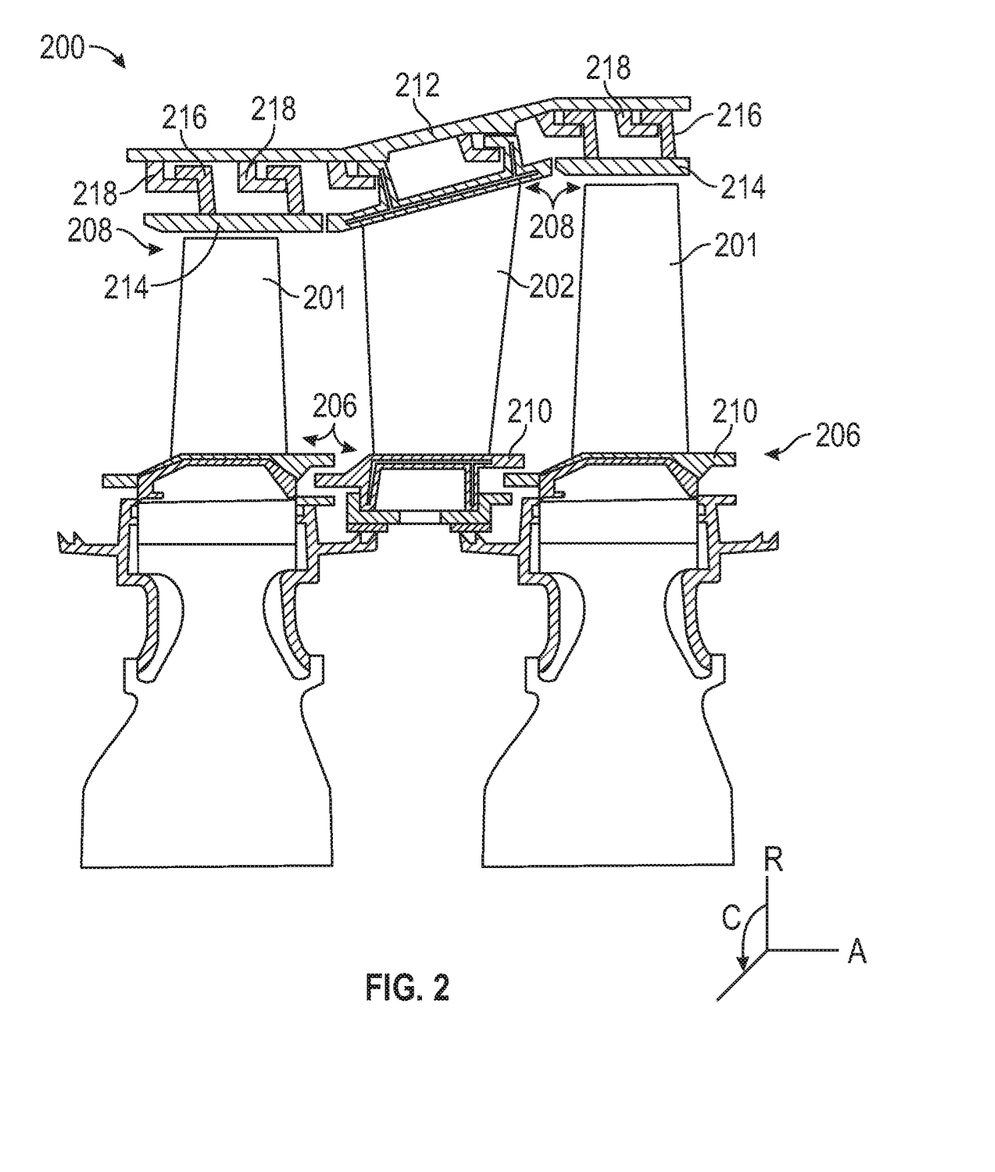
FIG. 2 is a schematic illustration of a portion of a turbine section of the gas turbine engine of FIG. 1.

FIG. 2 is a schematic view of a turbine section that may employ various embodiments disclosed herein. Turbine 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions within the airfoils 201, 202 that may extend either from the inner diameter 206 or the outer diameter 208 of the airfoil 201, 202. The partitions may extend for a portion of the length of the airfoil 201, 202, but may stop or end prior to forming a complete wall within the airfoil 201, 202. Thus, each of the airfoil cavities may be fluidly connected and form a fluid path within the respective airfoil 201, 202. The blades 201 and the vanes 202 may include platforms 210 located proximal to the inner diameter thereof. Located below the platforms 210 may be airflow ports and/or bleed orifices that enable air to bleed from the internal cavities of the airfoils 201, 202. A root of the airfoil may connected to or be part of the platform 210.

The turbine 200 is housed within a case 212, which may have multiple parts (e.g., turbine case, diffuser case, etc.). In various locations, components, such as seals, may be positioned between airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

In some configurations, airfoils, such as the blades 201 shown in FIG. 2, have unique stagnation lines (i.e., a radial extending line, normally along the leading edge of the airfoil). Along the stagnation line of the airfoil, freestream gas path air is forced to be redirected and splits toward the pressure or suction sides of the airfoil surfaces. Although some traditional airfoils may have a stagnation line extending radially along the leading edge and/or nearly coincident with a mechanical nose point of the external airfoil leading edge, the stagnation location is not necessarily confined to the airfoil leading edge region as previously defined. The stagnation line may be located along the external airfoil pressure surface of the airfoil leading edge region and/or may transition between the external airfoil pressure and suction side surfaces for non-conventional turbine airfoil aerodynamic design geometry shapes. For example, high-lift aerodynamic airfoil designs may have a geometry shape that is not lineal or comprise of a straight line leading edge. Such airfoils may have a stagnation line that is no longer on the visual leading edge of the airfoil. In some such geometries, as the radial extent of the airfoil increases, from the root of the airfoil toward the tip of the airfoil, the stagnation line transitions to the pressure side of the airfoil surface away from the leading edge surface where the pressure and suction side surfaces meet. As used herein, such stagnation lines will be referred to as "non-leading edge stagnation lines."

As will be appreciated by those of skill in the art, conventionally loaded aerodynamic design geometries are configured such that the stagnation line is coincident and/or nearly aligned with the airfoil mechanical leading edge nose point located proximate the airfoil leading edge surface. As such, it may be desirable to position a leading edge impingement cavity immediately adjacent to the external leading edge mechanical nose point. The leading edge impingement cavity is typically supplied cooling airflow from impingement aperture which function as conduits for cooling air that originates within the leading edge cooling cavities of the airfoil. Once in the leading edge impingement cavity, the cooling air flow is expelled through an array of shower head holes, thus providing increased convective cooling as well as a protective film to mitigate the locally high external heat flux along the leading edge airfoil surface. However, such techniques are not suited for producing cooling schemes along the non-leading edge stagnation lines of some airfoils, such as high-lift airfoils.

As will be appreciated by those of skill in the art, external airfoil regions coincident with or immediately adjacent to the stagnation line, along the leading edge surface of an airfoil, are exposed to the highest external heatload. A locally high external heat flux is attributed to high external freestream heat transfer coefficients and gas temperatures that result along an airfoil at a location where the local velocity along the airfoil surface is zero. At this location, the local external flow is said to be effectively "stagnated." In such scenarios, both the local airfoil total and static temperatures are equivalent and the local heat transfer coefficient is at a maximum. The absolute level of local heat transfer augmentation is attributed to a number of flow field and geometric conditions, which may include, but are not limited to, free stream turbulence levels, flow field unsteadiness, local airfoil surface radius of curvature, local absolute pressure and temperature levels, etc. Additionally, the rate of change in the local near wall velocity, acceleration, and airfoil surface pressure gradients determine local Reynolds Number and boundary layer growth rates, as well as, development lengths associated with laminar, transitional, and turbulent flow regimes which drive local external flow vorticity and subsequent heat transfer augmentation.

Traditionally, investment casting manufacturing processes utilize hard tooling "core dies" to create both external airfoil and internal cooling geometries. In order to fabricate internal cooling geometries, it is required that the definition of the features be created in the same relative orientation (approximately parallel) to the "pull" direction of the core die tooling. As a result, the orientation and location of any internal cooling features is limited by virtue of core tooling/core die manufacturing processes used for investment casting of turbine airfoils.

The orientation of the local internal rib geometry and positioning of the impingement cooling apertures is necessary to ensure optimal internal convective heat transfer characteristics are achieved to mitigate locally high external heat flux regions coincident with nonlinear airfoil stagnation lines associated with advanced aerodynamic design concepts. The curvilinear shape of the stagnation line location radially along the airfoil surface necessitates the desire to vary the internal rib location and impingement flow aperture orientations as a function of radial location. The angular rotation or "twisting" of the internal rib and impingement flow apertures is necessary to align the impinging cooling flow with the curvilinear nature of the external stagnation line radially along the airfoil surface. Conventional internal core dies and core manufacturing processes are not conducive to fabricating continuous three-dimensional nonlinear "twisting" rib geometries and impingement flow aperture features. Internal core ribs and cooling flow apertures with varying angular orientation in a span-wise direction cannot be manufactured due to constraints associated with the unidirectional design requirements that geometry features be created in the same relative orientation approximately parallel to the "pull" direction of the core die tooling.

Figure 3A:
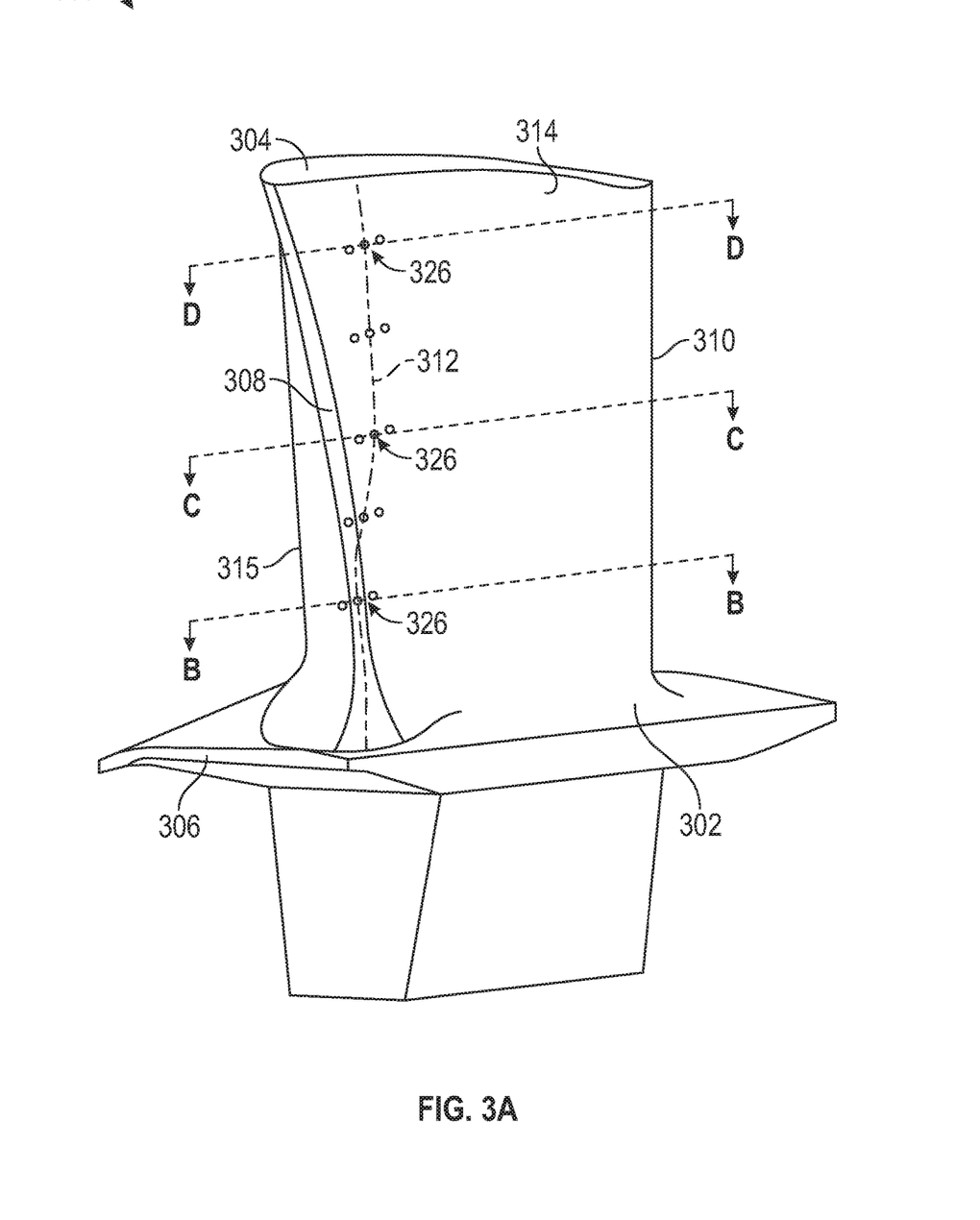
FIG. 3A is an isometric elevation illustration of an airfoil in accordance with an embodiment of the present disclosure.
Figure 3B:
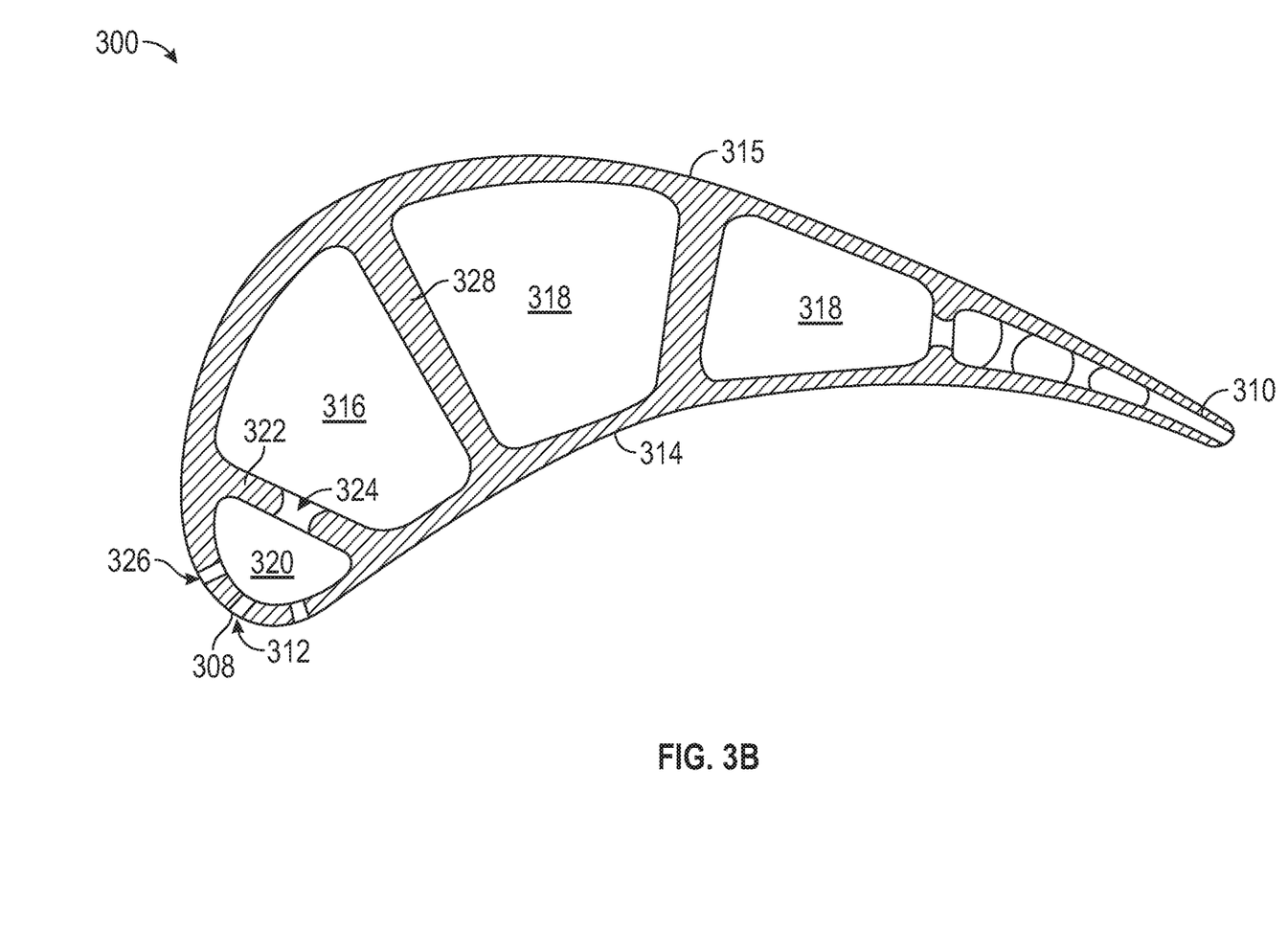
FIG. 3B is a cross-sectional illustration of the airfoil as viewed along the line B-B shown in FIG. 3A.
Figure 3C:
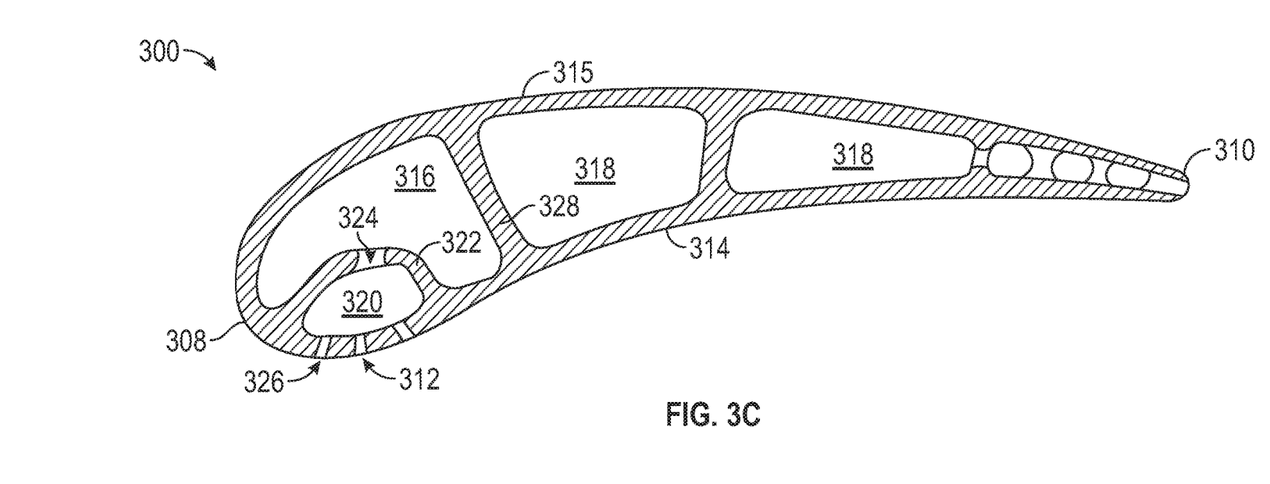
FIG. 3C is a cross-sectional illustration of the airfoil as viewed along the line C-C shown in FIG. 3A.
Figure 3D:
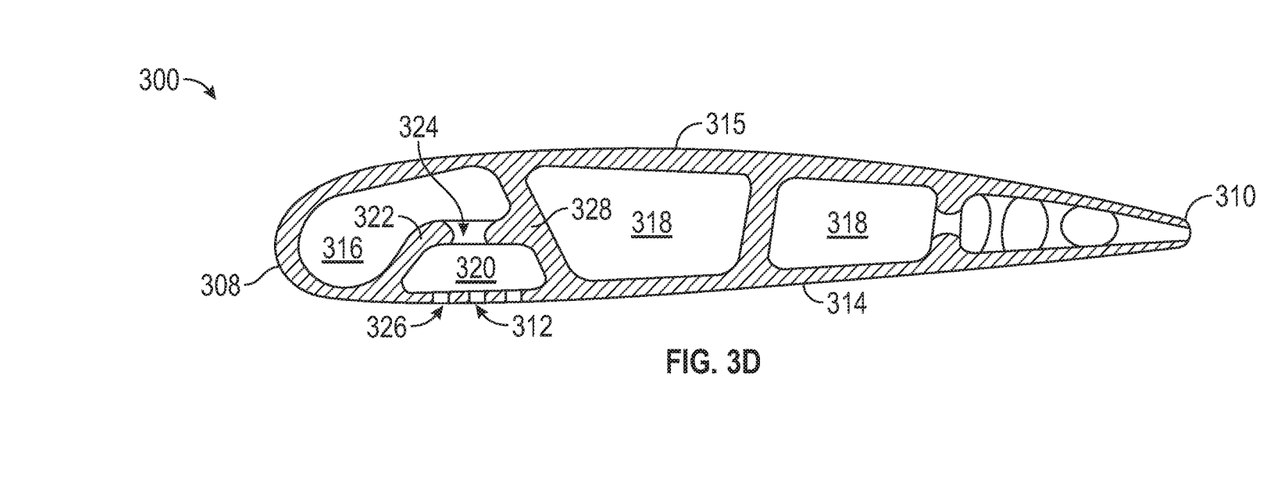
FIG. 3D is a cross-sectional illustration of the airfoil as viewed along the line D-D shown in FIG. 3A.

Turning now to FIGS. 3A-3D, schematic illustrations of an airfoil 300 in accordance with an embodiment of the present disclosure are shown. FIG. 3A is an isometric elevation illustration of the airfoil 300. FIG. 3B is a cross-sectional illustration of the airfoil 300 as viewed along the line B-B shown in FIG. 3A. FIG. 3C is a cross-sectional illustration of the airfoil 300 as viewed along the line C-C shown in FIG. 3A. FIG. 3D is a cross-sectional illustration of the airfoil 300 as viewed along the line D-D shown in FIG. 3A.

The airfoil 300 extends radially between a first end 302 and a second end 304. In embodiments where the airfoil is a blade, the first end 302 may be a root, and the second end 304 may be the tip of the blade. In the present embodiment, the airfoil 300 extends radially from a platform 306 at the first end 302 thereof. The airfoil 300 extends in an axial direction between a leading edge surface 308 and a trailing edge surface 310. As shown, a non-leading edge stagnation line 312 extends between the first end 302 and the second end 304. With reference to FIGS. 3A-3D, the airfoil 300 extends between a pressure side surface 314 and a suction side surface 315 in a circumferential direction.

The non-leading edge stagnation line 312 does not follow the shape, contour, or geometry of the leading edge surface 308, but rather transitions toward and aftward along the pressure side surface 314 of the airfoil 300. This is shown as indicated in FIGS. 3B-3D, with FIG. 3D illustrating the location of the non-leading edge stagnation line 312 near the first end 302 of the airfoil 300, with the non-leading edge stagnation line 312 aligned with the leading edge surface 308. However, as the airfoil 300 extends radially outward from the first end 302, the non-leading edge stagnation line 312 moves toward and aftward along the pressure side surface 314 of the airfoil 300, as illustrated in FIG. 3C and FIG. 3B. The changes in external airfoil geometry shape of the airfoil 300 cause the aerodynamic loading to be non-uniform in the radial direction. The differences in local radial aerodynamic loading produce changes in the local pressure gradients and local airfoil surface static pressure distributions. Additionally, the relative location of the stagnation point moves along the airfoil surface due to changes in aerodynamic loading, relative airfoil inlet velocity triangles, and freestream gas incidence angles.

The airfoil 300 includes a number of internal cooling cavities, as shown in FIGS. 3B-3D. A leading edge feed cavity 316 is located near the leading edge surface 308 of the airfoil 300, and additional cooling cavities 318 are located aft of the leading edge feed cavity 316. The additional cooling cavities 318 can include various internal cavities as will be appreciated by those of skill in the art, including, but not limited to, a serpentine cooling passage, a trailing edge cavity, or other cavities, and the illustrations provided herein are not intended to be limiting but rather are provided for illustrative purposes.

A stagnation impingement cavity 320 is formed proximate the leading edge feed cavity 316 and fluidly connected thereto. The stagnation impingement cavity 320 is arranged to track or follow the non-leading edge stagnation line 312 along the span of the airfoil 300 from the first end 302 to the second end 304. As shown, the geometry of the stagnation impingement cavity 320 changes shape and location as the non-leading edge stagnation line 312 transitions toward and aftward along the pressure side surface 314 of the airfoil 300.

The stagnation impingement cavity 320 is defined, in part, by an impingement rib 322. The impingement rib 322 may comprise various geometric shapes and orientations as the airfoil geometry shape changes in the radial direction in order to track or follow the non-leading edge stagnation line 312 as it transitions from the leading edge surface 308 at the first end 302 to a location toward and along the pressure side surface 314 in the direction of the second end 304. The non-leading edge stagnation line 312 is also defined in part by an external wall of the airfoil 300, with the portion of the external wall transitioning from the leading edge surface 308 to a portion of the wall of the airfoil 300 on the suction side surface 314 of the airfoil 300.

One or more impingement apertures 324 are formed in the impingement rib 322, and allow for cooling air from within the leading edge feed cavity 316 to impinge into the stagnation impingement cavity 320, and impinge upon the internal surface of the external wall of the airfoil 300. The impingement apertures 324 are oriented such that the direction and velocity of the cooling air flow impinges on the internal wall surface of the exterior wall of the airfoil 300 in a location nearly coincident with the local non-leading edge stagnation line location. The cooling air flow passes through the impingement apertures 324 from at least one leading edge feed cavity 316 and will impinge upon the internal backside surface of the exterior wall of the airfoil 300 (within the respective areas of the stagnation impingement cavity 320) that is at the non-leading edge stagnation line 312. Thus, the impinging air can effectively cool the local exterior wall of the airfoil 300 at the airfoil location that is exposed to the highest external heat flux and hottest gas temperatures during operation (i.e., cooling achieved at the non-leading edge stagnation line 312).

It should be recognized by those skilled in the art that the impingement apertures may be of various geometric shapes, sizes, and orientations. The impingement flow apertures may comprise of, but are not limited to, circular, elliptical, oval, teardrop, triangular, and/or slot geometry shapes containing at least one radius of curvature and/or at least one inflection point. Although the impingement rib as disclosed herein only depicts a singular impingement aperture 324 it should be recognized that the impingement rib may contain multiple and/or an array of impingement apertures to provide a greater distribution of impingement cooling to the airfoil region of the non-leading edge stagnation line location.

The cooling air within the stagnation impingement cavity 320 may bleed from the stagnation impingement cavity 320 through one or more purge holes 326 (e.g., film cooling holes, showerhead holes, etc.). Although depicted as film cooling holes, those of skill in the art will appreciate that the geometric shapes of the film cooling holes 326 may be of constant, diffusing, and/or diverging flow area. The film hole geometries may comprise of, but are not limited to, cylindrical, oval, elliptical, and/or slots. Additionally, the film cooling hole geometries may also include single and/or multiple diffusing surfaces that may be planar and/or comprise of single or multiple lobed geometry shapes. The cooling air that purges from the stagnation impingement cavity 320 may form a cooling film on the exterior surface of the airfoil 300 at the location of the non-leading edge stagnation line 312 (and aftward therefrom). A pressure differential between the stagnation impingement cavity 320 and the leading edge feed cavity 316 causes the impinging air to flow through the impingement apertures 324.

The leading edge feed cavity 316 is defined within the airfoil 300 between an external wall of the airfoil 300, the impingement rib 322 and an internal cavity wall 328. The internal cavity wall 328 separates the leading edge feed cavity 316 from another cooling cavity 318, and may provide structural support to the airfoil 300. As shown, as the stagnation impingement cavity 320 transitions from the leading edge surface 308 along the pressure side surface 314 of the airfoil 300, the impingement wall 322 changes position, orientation, and geometry shape. For example, as shown in FIG. 3B, the impingement rib 322 extends between the pressure side surface 314, leading edge surface 308, and the suction side surface 315 of the airfoil 300. At a mid-span region, as shown in FIG. 3C, the impingement rib 322 extends between the leading edge surface 308 (or a location on the pressure side surface 314) and the pressure side surface 314. Proximate the second end 304, as shown in FIG. 3D, the impingement rib 322 extends between a point on the pressure side surface 314 of the airfoil 300 and the internal cavity wall 328.

Although FIGS. 3A-3D may be interpreted as illustrating a single, continuous stagnation impingement cavity 320 extending between the first end 302 and the second end 304, such arrangement is not to be limiting. Although a single stagnation impingement cavity 320 may extend the full span of the airfoil from the first end 302 to the second end 304, in other embodiments, the stagnation impingement cavity 320 may be formed of two or more sub-cavities that are separated from each other. Such configurations can enable optimized cooling characteristics within the various sub-cavities of the stagnation impingement cavity 320.

Figure 4A:
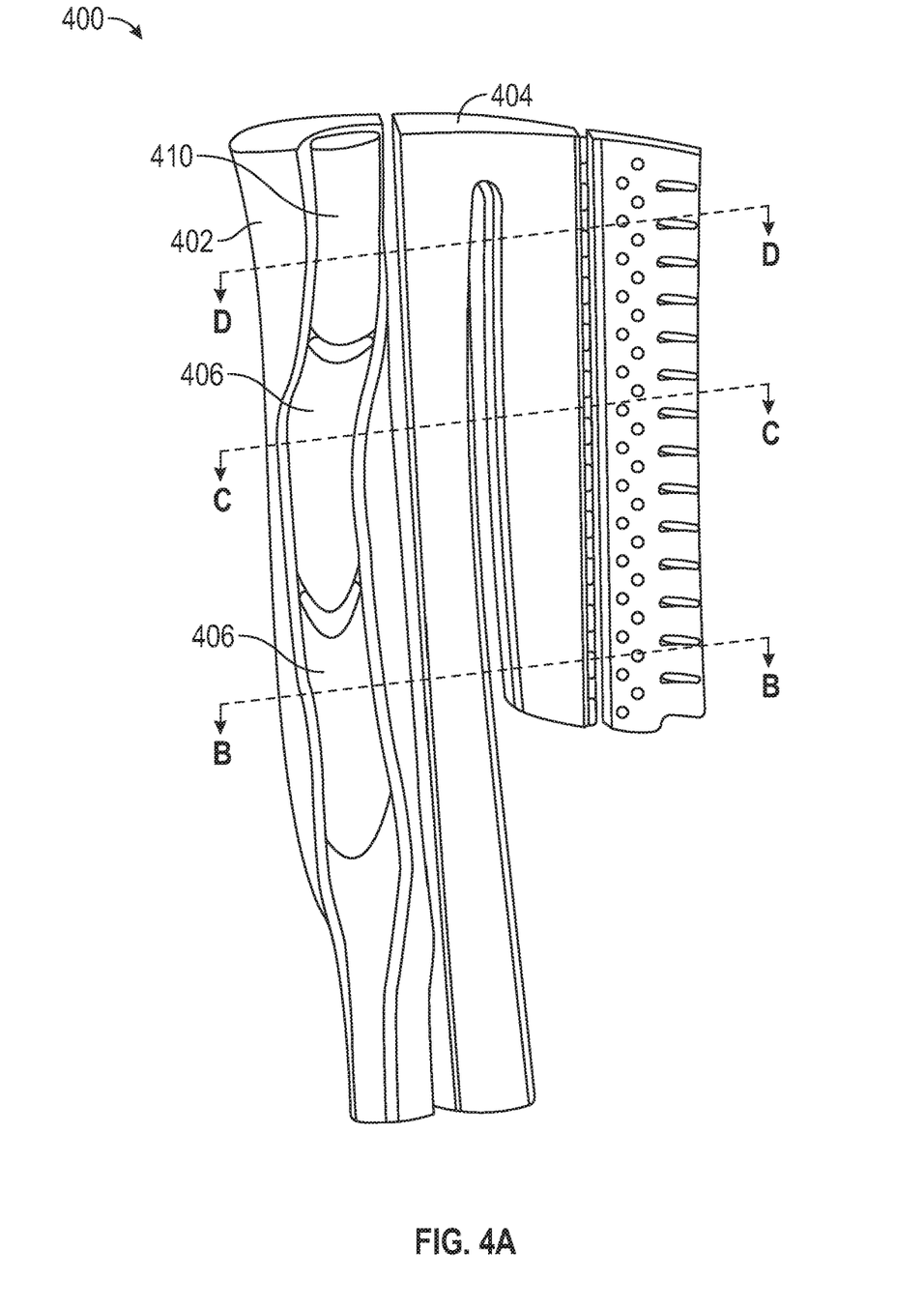
FIG. 4A is a schematic illustration of a core assembly for forming an airfoil in accordance with an embodiment of the present disclosure.
Figure 4B:
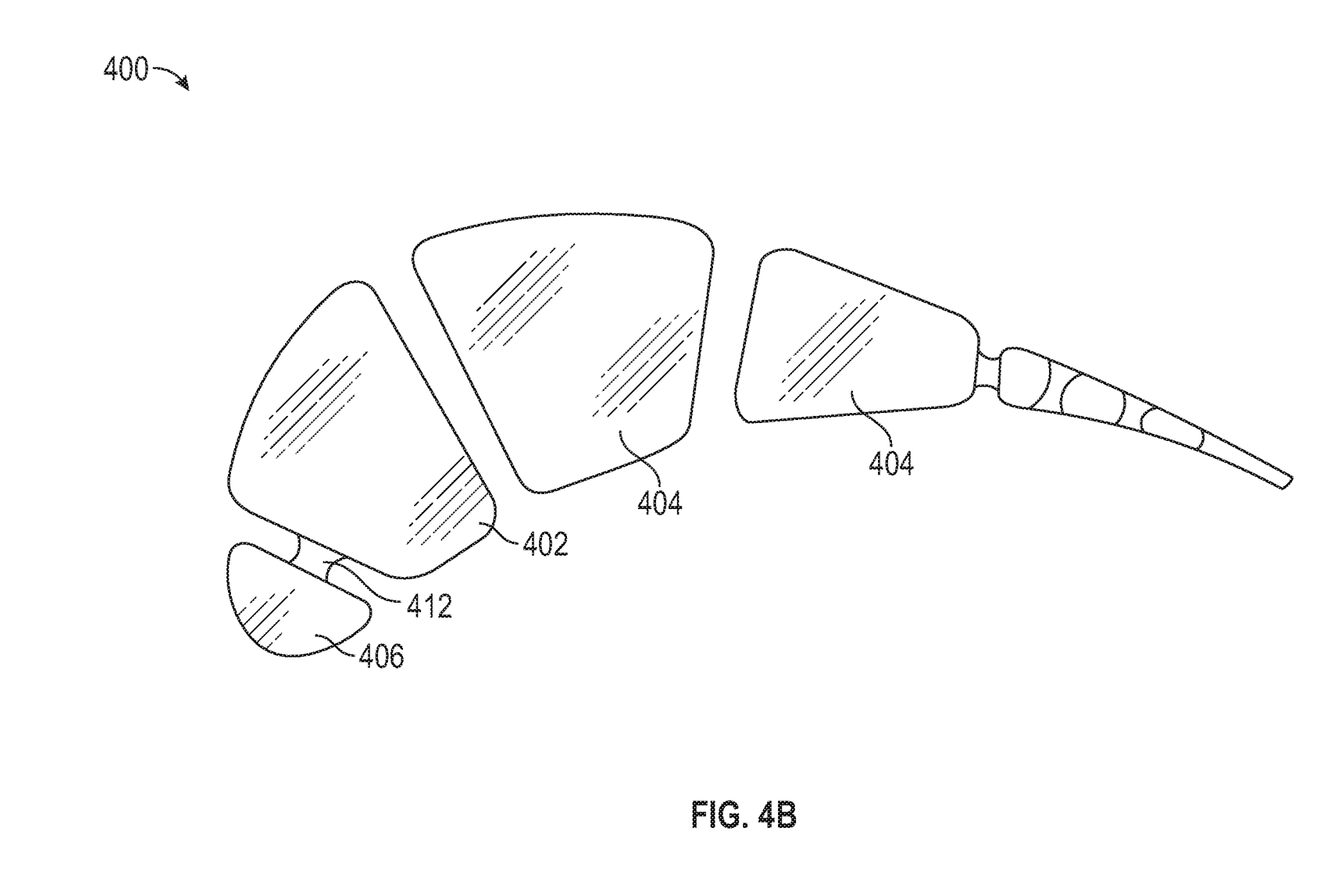
FIG. 4B is a cross-sectional illustration of the core assembly as viewed along the line B-B shown in FIG. 4A.
Figure 4C:
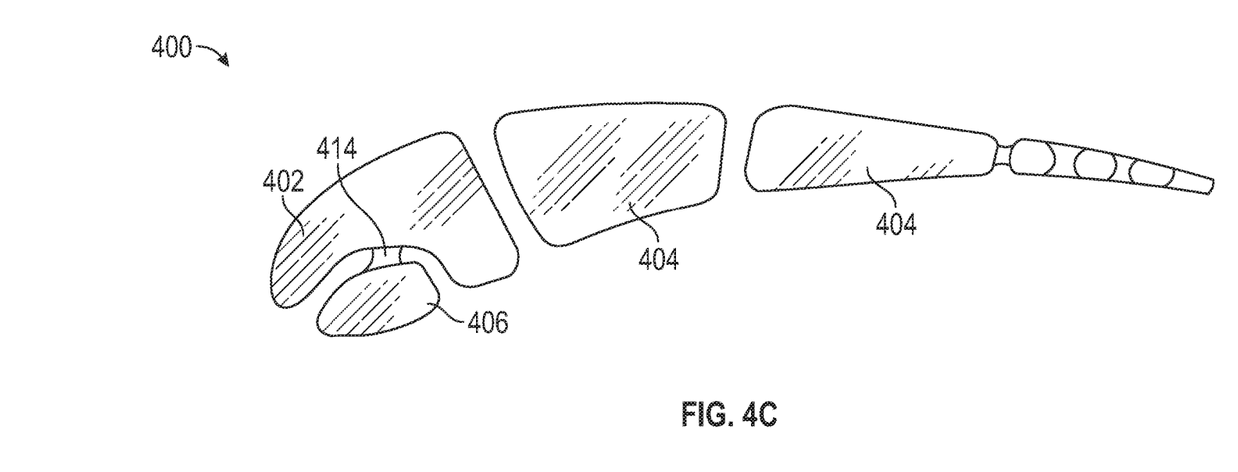
FIG. 4C is a cross-sectional illustration of the core assembly as viewed along the line C-C shown in FIG. 4A.
Figure 4D:
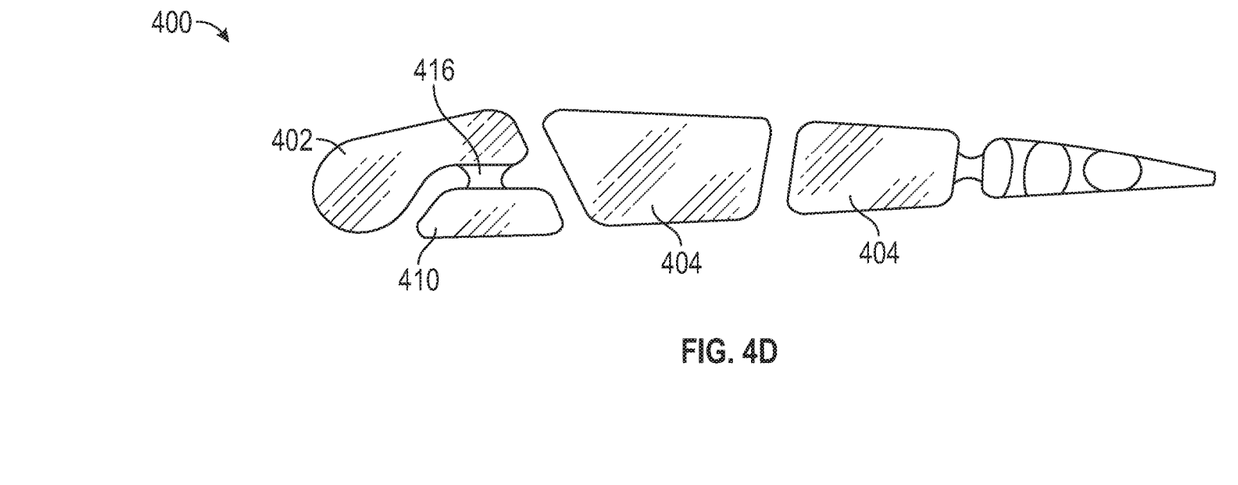
FIG. 4D is a cross-sectional illustration of the core assembly as viewed along the line D-D shown in FIG. 4A.

For example, turning to FIGS. 4A-4D, a schematic illustrations of a core assembly 400 for forming an airfoil in accordance with an embodiment of the present disclosure. FIG. 4A is an isometric elevation illustration of the core assembly 400. FIG. 4B is a cross-sectional illustration of the core assembly 400 as viewed along the line B-B shown in FIG. 4A. FIG. 4C is a cross-sectional illustration of the core assembly 400 as viewed along the line C-C shown in FIG. 4A. FIG. 4D is a cross-sectional illustration of the core assembly 400 as viewed along the line D-D shown in FIG. 4A.

The core assembly 400 includes a leading edge feed cavity core 402 and an airfoil cavity core 404. The leading edge feed cavity core 402 is arranged to form a leading edge feed cavity similar to that shown in FIGS. 3A-3D. The airfoil cavity core 404 is arranged to form one or more additional cooling cavities within an airfoil, similar to the additional cavities shown in FIGS. 3A-3D. Although shown as a single unitary piece, the airfoil cavity core 404 may comprise multiple separate (connected or non-connected) sub-cores, as will be appreciated by those of skill in the art.

As shown, a number of stagnation impingement cavity sub-cores 406, 408, 410 are connected to the leading edge feed cavity core 402 by respective impingement hole cores

412, 414, 416. The stagnation impingement cavity sub-cores 406, 408, 410 are arranged to form a stagnation impingement cavity similar to that shown and described above, and in this embodiment are arranged to form a stagnation impingement cavity formed of separate sub-cavities, with each sub-cavity formed by a respective stagnation impingement cavity sub-cores 406, 408, 410.

As shown in FIGS. 4A-4D, the stagnation impingement cavity sub-cores 406, 408, 410 change position and orientation relative to the leading edge feed cavity core 402 at the different span positions (e.g., positioned relative to a root and tip of a formed airfoil). Further, as shown, the geometry of each stagnation impingement cavity sub-core 406, 408, 410 is different, in this embodiment, and may be selected to optimize a cooling scheme along a non-leading edge stagnation line of the formed airfoil.

The core assembly 400 and the parts thereof, can be formed, in part, through various manufacturing techniques. For example, various parts of the assembly core 400 can be formed through alternative casting and additive manufacturing processes and can be formed directly using metal powder base fusion additive manufacturing processes. Additionally, the core assembly 400, or parts thereof, may be created using additive manufacturing processes fabricated using ceramic alumina or silica core material from which conventional lost wax investment casting processes may be used to integrally form the cores. Accordingly, those of skill in the art will appreciate that various fabrication and/or manufacturing techniques and processes can be employed to manufacture embodiments described herein. For example, the use of alternative manufacturing processes can be employed, including, but not limited to, fugitive core technology and/or additive technology to fabricate the core assembly 400, or parts thereof. Utilization of these technologies enables separate fabrication of the core assembly 400, or parts thereof, may enable the core assembly 400 to be an integral component of a design configuration, which may not require a separate assembly and manufacturing operation to form an airfoil.

Advantageously, embodiments provided here are directed to airfoils and core assemblies to form airfoils that enable improved cooling schemes for non-leading edge stagnation line designed airfoils. Further, advantageously, embodiments provided here improve cooling to a stagnation line which further can increase part life.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component for a gas turbine engine, the component comprising:
   an airfoil extending in a radial direction from a first end to a second end, and extending axially from a leading edge to a trailing edge, the airfoil having a pressure side and a suction side, wherein the airfoil has a non-leading edge stagnation line formed during operation such that the non-leading edge stagnation line transitions from a location along a leading edge surface of the airfoil at the first end to a location on the airfoil on a pressure side surface of the airfoil at the second end;
   a leading edge feed cavity formed in the leading edge of the airfoil, the leading edge feed cavity extending between the first end and the second end of the airfoil;
   a stagnation impingement cavity formed within the airfoil and extending along a surface of the airfoil that aligns with the non-leading edge stagnation line, such that a portion of the stagnation impingement cavity is located proximate the leading edge surface of the airfoil at the first end and a portion of the stagnation impingement cavity is located proximate a side of the airfoil at the second end; and
   at least one impingement aperture fluidly connecting the leading edge feed cavity to the stagnation impingement cavity, the at least one impingement aperture arranged to impinge upon an interior surface of the airfoil at the non-leading edge stagnation line.

2. The component of claim 1, wherein the airfoil is a blade, the first end is a root of the blade, and the second end is a tip of the blade.

3. The component of claim 1, wherein the side of the airfoil at the second end is the pressure side of the airfoil.

4. The component of claim 1, wherein the stagnation impingement cavity comprises a plurality of sub-cavities.

5. The component of claim 1, further comprising at least one purge hole formed in an external wall of the airfoil and arranged to purge air from within the stagnation impingement cavity.

6. The component of claim 1, further comprising an impingement rib located within the airfoil and separating the leading edge feed cavity from the stagnation impingement cavity, wherein at least one impingement aperture is formed within the impingement rib to fluidly connect the leading edge feed cavity to the stagnation impingement cavity.

7. The component of claim 6, wherein the impingement rib extends between the pressure side and the suction side of an interior of the airfoil proximate the first end and between the pressure side of the airfoil and an interior cavity wall proximate the second end.

8. The component of claim 7, wherein the impingement rib extends between the leading edge of the airfoil and the pressure side of the airfoil at a location between the first end and the second end.

9. A core assembly for forming a component of a gas turbine engine, the core assembly comprising:
- a leading edge feed cavity core arranged to form a leading edge feed cavity in a formed airfoil, the leading edge feed cavity core extending between a first end and a second end;
- a stagnation impingement cavity core connected to the leading edge feed cavity core and arranged to form a stagnation impingement cavity within a formed airfoil such that the formed stagnation impingement cavity aligns with a non-leading edge stagnation line,
- wherein a portion of the stagnation impingement cavity core is located proximate a leading edge of the formed airfoil at the first end and a portion of the stagnation impingement cavity core is located proximate a side of the formed airfoil at the second end, and
- at least one impingement core hole configured to form an impingement aperture fluidly connecting the formed leading edge feed cavity to the formed stagnation impingement cavity, the at least one impingement aperture formed by the respective at least one impingement core hole to enable impinging air upon an interior surface of the formed airfoil at the non-leading edge stagnation line.

10. The core assembly of claim 9, wherein the stagnation impingement cavity core comprises a plurality of cavity sub-cores.

11. The core assembly of claim 9, further comprising at least one impingement aperture core arranged to form a respective impingement aperture in the formed airfoil to fluidly connect the formed leading edge feed cavity to the formed stagnation impingement cavity.

12. The core assembly of claim 9, wherein the airfoil is a high-lift blade of a gas turbine engine.

13. A gas turbine engine comprising:
- an airfoil extending in a radial direction from a first end to a second end, and extending axially from a leading edge to a trailing edge, the airfoil having a pressure side and a suction side, wherein the airfoil has a non-leading edge stagnation line formed during operation such that the non-leading edge stagnation line transitions from a location along a leading edge surface of the airfoil at the first end to a location on the airfoil on the pressure side of the airfoil at the second end;
- a leading edge feed cavity formed in the leading edge of the airfoil, the leading edge feed cavity extending between the first end and the second end of the airfoil;
- a stagnation impingement cavity formed within the airfoil and extending along a surface of the airfoil that aligns with the non-leading edge stagnation line, such that a portion of the stagnation impingement cavity is located proximate the leading edge surface of the airfoil at the first end and a portion of the stagnation impingement cavity is located proximate a side of the airfoil at the second end; and
- at least one impingement aperture fluidly connecting the leading edge feed cavity to the stagnation impingement cavity, the at least one impingement aperture arranged to impinge upon an interior surface of the airfoil at the non-leading edge stagnation line.

14. The gas turbine engine of claim 13, wherein the airfoil is a blade, the first end is a root of the blade, and the second end is a tip of the blade.

15. The gas turbine engine of claim 14, wherein the blade is a high-lift blade of a gas turbine engine.

16. The gas turbine engine of claim 13, wherein the stagnation impingement cavity comprises a plurality of sub-cavities.

17. The gas turbine engine of claim 13, further comprising at least one impingement aperture fluidly connecting the leading edge feed cavity to the stagnation impingement cavity.

18. The gas turbine engine of claim 13, further comprising at least one purge hole formed in an external wall of the airfoil and arranged to purge air from within the stagnation impingement cavity.

19. A component for a gas turbine engine, the component comprising:
- an airfoil extending in a radial direction from a first end to a second end, and extending axially from a leading edge to a trailing edge, the airfoil having a pressure side and a suction side, wherein the airfoil has a non-leading edge stagnation line formed during operation such that the non-leading edge stagnation line transitions from a location along a leading edge surface of the airfoil at the first end to a location on the airfoil on a pressure side surface of the airfoil at the second end;
- a leading edge feed cavity formed in the leading edge of the airfoil, the leading edge feed cavity extending between the first end and the second end of the airfoil;
- a stagnation impingement cavity formed within the airfoil and extending along a surface of the airfoil that aligns with the non-leading edge stagnation line, such that a portion of the stagnation impingement cavity is located proximate the leading edge surface of the airfoil at the first end and a portion of the stagnation impingement cavity is located proximate a side of the airfoil at the second end; and
- an impingement rib located within the airfoil and separating the leading edge feed cavity from the stagnation impingement cavity, wherein at least one impingement aperture is formed within the impingement rib to fluidly connect the leading edge feed cavity to the stagnation impingement cavity,
- wherein the impingement rib extends between the pressure side and the suction side of an interior of the airfoil proximate the first end and between the pressure side of the airfoil and an interior cavity wall proximate the second end, and wherein the impingement rib extends between the leading edge of the airfoil and the pressure side of the airfoil at a location between the first end and the second end.

* * * * *